United States Patent Office 3,334,975
Patented Aug. 8, 1967

3,334,975
HARDFACING RODS AND ELECTRODES
Joseph F. Quaas, Island Park, and Charles E. Rogers, Bayside, N.Y., assignors to Eutectic Welding Alloys Corporation, Flushing, N.Y., a corporation of New York
No Drawing. Filed Aug. 31, 1964, Ser. No. 393,375
19 Claims. (Cl. 29—191.6)

The present invention relates to tubular hardfacing welding rods and electrodes. More particularly the invention relates to such rods and electrodes which are useful for depositing hard carbide particles on a parent material to produce cutting and/or wearing surfaces.

Hard surfacing materials are widely used for applying a hard surface to a base material to protect the base material from abrasive wear or to provide a cutting surface thereon. These surfaced materials, e.g., metal, are used to provide wear-resistant surfaces for tools such as hand and power shovels, cutting tools, etc. A widely used type of such hard surfacing material incorporates hard particles such as refractory carbides within a tube of metal. The tube functions to support the refractory carbides, alloy with the final deposit and in some cases as in the case of electric arc welding, act as the electro conductive material. The hard surfacing is deposited from such rods and electrodes by thermal fusion through the use of a high-temperature gas flame, an electric arc or a similar source of heat. Depending on the source of heat the tube is characterized as a welding rod or as both a welding rod and an electrode (e.g. gas flame and electric arc respectively).

Welding rods and electrodes have been formed by placing carbide particles within a metal tube or within a strip of metal which is formed into a tube. Mild or low carbon steel strip has been employed as a tube material. In addition to the carbide particles, small amounts of other materials such as deoxidizers, alloying agents and binder materials have been placed within the metal tube in order to vary the deposit formed. The sum of the ingredients within the tube are generally called filler materials.

In the application of these rods and electrodes, the tube metal and its contents are deposited in the weld puddle during the deposition sequence. It is generally advantageous to have the carbide granules suspended uniformly in the weld puddle. When uniformly dispersed they better perform their intended function of cutting and/or resisting abrasion.

When the rod or electrode is deposited in the molten state, it is desirable to have the molten material dissolve a limited amount of the carbides. Thus when using tungsten carbide for example, the dissolution of the carbide, in addition to any alloying elements also present within the tube, enhances the properties of the deposit making it more resistant to abrasive action. Furthermore, the deposit is harder and the tendency for the matrix to be worn or cut from around the suspended carbide grains is substantially lessened. The deposit has, therefore, an increased service life. Needless to say, however, this solutioning effect destroys the carbide itself and for this reason a large amount of solutioning is to be avoided.

Welding rods and electrodes of the above-mentioned construction should deposit as high a carbide content as possible to produce long wearing and cutting surfaces. The utility and service properties of deposits are dependent on a number of inter-related factors including the content of carbides as well as the hardness, wear resistance and brittle tendencies of the matrix metal. Previous welding rods were limited in general to a maximum carbide content of about 60 percent. Needless to say, any increase in the weight percent of the carbide within the rod or electrode, while at the same time being able to deposit the carbides without substantial degradation during application is most advantageous.

Various filler and alloying agents have been incorporated within the welding rods and tubes in order to vary the properties of the ultimate deposit. The common ferroalloy or pure metal additions within the tube are ordinarily of a much lower density than the carbide grains. Thus mechanical mixtures of such materials with the carbides are subject to segregation within the tube due to widely varying densities. Such uneven distribution within the tube results in too much alloying in some portions of the deposit and not enough alloying in other portions. This results not only in uneven deposits but also in partly brittle deposit subject to cracking and loss of carbides. Therefore the types of alloying agents and the manner of addition is of utmost importance in attaining an even deposit of desired properties which is not brittle.

It is an object of this invention to provide tubular hard facing welding rods and electrodes which are useful in depositing carbide containing wearing and/or cutting surfaces. It is an additional object to provide such rods and electrodes which will deposit a uniform dispersion of carbide particles within a matrix alloy. A further object is to provide such rods and electrodes which will provide a uniform, hard, shock and brittle resistant deposit on a parent material. An additional object of the invention is to provide such rods and electrodes which maintain a uniform proportional distribution of supplemental materials within the tube. Prevention of excess solutioning of carbides, the attendant loss of carbides and brittle deposits is a further object of the invention. Additionally, an object of this invention is a rod and electrode which will deposit a high proportion of carbides relative to the remaining materials comprising the rod and electrode. Furthermore, it is an object of this invention to provide such a rod and electrode whose interior materials will not segregate and produce non-uniform deposits detrimental to service life. Further objects will become apparent as the description proceeds.

It has been discovered that a tubular welding rod and electrode will accomplish these and other objects if the tube material is of a particular composition. More specifically it has been found that if the usual low carbon or mild steel tube material is replaced by a special alloy steel having a medium carbon content and a high manganese content, outstanding rods and electrodes are produced which accomplishes the objects of the present invention.

As previously stated, in place of the usual low carbon or mild steel strip there is used a special alloy steel with a medium carbon content and a high manganese content. By experiment and through actual field tests it has been found that this tube material produces a stronger and more wear resistant matrix and yet one that is not brittle when subjected to heavy impact. The service life of tools hard surfaced by the carbide containing matrix is thus substantially increased.

It has been also found that it is possible to increase the carbide content of the tube and therefore of the deposit without causing additional brittleness of the matrix because the special strip flows more readily during deposition and requires less superheat. Thus the time the deposit is in the liquid state is substantially reduced which is the time when the carbide is most likely to be dissolved.

The nature of a molten metal weld deposit is such that prolonged fluidity will increase the amount of refractory materials entering the solution. The melting point of, for example, tungsten carbide is high enough so that it is not easily melted in the heat source. In fact, it is virtually impossible to melt. However, solubility is another thing. Under conditions of prolonged fluidity of the weld metal, tungsten carbide is dissolved. It becomes in solution an alloy of tungsten with the other elements present, such as iron, manganese, silicon, etc. and the useful carbide granular structure is destroyed. It is virtually impossible to make a deposit of a composite rod without dissolving some of the tungsten carbide. Nevertheless it is most desirable to limit the amount lost by solution since ultimate service life is partially dependent on the amount of effectively deposited carbide. A balance between the two effects must be struck. While it would be thought that a short period of fluidity would be disadvantageous to the deposition technique it has been found in practice that this is not true. Furthermore, while it was thought that relatively large amounts of carbide should go into solution it has been found that the controlled amounts of the present invention provide a harder and more wear resistant matrix.

Since the rod of the present invention will be applied by weldors of widely varying skills, it is advantageous to provide the most foolproof rod possible, which can be applied easily, rapidly, and with highly consistent results.

It has further been found that applying a light plating of copper, nickel, tin or chromium on the outside of the tube has a number of advantages including further control over the fluid phase and the freezing point of the weld puddle as obtained.

The plating of the steel tube is most economically done on both sides of the strip. Its prime function is to provide corrosion resistance and appearance to the finished product. However, in addition to the "cosmetic" utility, definite utility functions are performed by the plating. These elements provide additional fluidity to the weld puddle and of course must be in balance to the other fluidizers present such as ferro tungsten, manganese, silicon, carbon, etc. The right balance of these elements with the plating element provides a melt of such fluidity as to be easily placed on the workpiece and the proper viscosity to shape the deposit when the heat of the flame is removed. In other words, the liquidus-solidus range of the molten metal is controlled to the most advantageous range.

The plating thickness for each side of the strip can in general be from .00002 to .00008 inch. The total weight percent of the plating, whether on both or only one side of the strip is between .005 percent to 0.010 percent of the total rod.

The steel tube material of the present invention comprises the following constituents in the following percents by weight:

| Constituents | Weight percent | |
| --- | --- | --- |
| | Broad | Preferred |
| Carbon | 0.15–0.30 | 0.18–0.20 |
| Silicon | 0.15–0.40 | 0.20–0.30 |
| Manganese | 0.90–1.50 | 1.10–1.40 |
| Iron | Balance | Balance |

The steel tube material besides producing a deposit of high strength and good wear properties also makes it possible to avoid the use of conventional deoxidizers such as silico manganese and to prevent segregation of such low density additives by their elemination as filler material. Previous tubes of the same general construction utilized from about 0.50 to 3.00 percent by weight of a deoxidizer such as silico manganese mixed with the carbides. Since this material is of much lighter density than the carbides, severe segregation was likely to occur making it very difficult to maintain uniform weldability throughout the rod. Also, since the filler materials for these tubes (e.g., carbides, alloying agents, binder materials, deoxidizers, etc.) are, in commercial practice, mixed in large scale batches, rods and electrodes produced by using the same batch differed widely due to segregation of the mixtures. The steel strip of the present invention incorporates manganese and silicon within the tube itself and in conjunction with the carbon provides proper flowing qualities rather than depending on silico manganese powder in admixture with the carbide.

By eliminating the necessity to include conventional deoxidizers within the filler material, there is the further advantage that higher amounts of carbide may be included therein. Thus by necessity the prior art additions supplanted large amounts of the most desirable element, carbides. Since the carbides have a density about twice that of the silico manganese, the proportional displacement of carbides by the silico manganese was relatively large.

The tube material comprising the special steel strip of the invention has the further advantage of providing more accurate control over minor additions of supplementing materials. The steel strip can be carefully controlled as to constitution. Furthermore, the strip uniformly covers the entire filler material. Forgetting the segregation problems for the moment, it is very difficult to obtain a uniform mixture initially between the supplementing materials and the carbides. By the steel strip of the invention it is insured that a uniform covering, proportionally equal throughout the length of the tube is obtained and this is maintained during storage. The equal proportions are maintained both as to the constituents within the tube material itself and the ratio of tube material constituents to filler material constituents along the entire length of the tube.

If more deoxidizer is needed for specific operations, small amounts of, for example, silico manganese or other sources of silicon and manganese may be added. It is advisable under these circumstances to feed the deoxidizer into the tube during the forming stage at a constant rate by means of a separate feeding mechanism or hopper. This separate feeding method insures proper distribution of the added elements and helps to avoid segregation due to difference in densities. As an example, the silico-manganese may contain from 65 to 70 weight percent mangenese, 16 to 25 weight percent silicon and up to 2.5 percent carbon. Needless to say, such additions are generally avoided since they displace proportionally higher amounts of carbides. However, in some cases it may be necessary to utilize additional amounts of deoxidizer.

Carbide materials useful when incorporated within the special alloy tube include any of the carbides of metals such as chromium, molybdenum, tungsten, vanadium, tantalum, columbium, zirconium, boron, titanium or silicon. Suitable mixtures of these carbides or compound carbides of two or more may also be used.

Tungsten carbide has been found to be best suited for use according to the invention. The tungsten carbide may be used either as the WC type containing about 6% carbon, or as the composite type WC, $W_2C$ containing about 4% carbon or mixtures may be used. Researches and field tests have indicated that the composite carbide WC, $W_2C$, has the most widespread usage for cutting, drilling, scraping and general earth-moving or earth-working applications. It is less susceptible to dissolution into the molten deposit than the 6% carbon grade and its method of manufacture by melting, casting and crushing into graded mesh sizes provides more angular grain shape with sharp cutting edges. Also its lower carbon content makes it less liable to fracture under impact while maintaining maximum hardness.

Pure cast tungsten carbide is the particularly preferred carbide and comprises a homogeneous solid crystalline mass generally free of voids or internal flaws. The use of cast tungsten carbide particles in the hard facing of parent materials is disclosed and claimed in copending application S.N. 322,585, filed Nov. 7, 1963, now abandoned. In commercial usage the carbon content of these particles is controlled in the range of 3.7 to 3.9%. It has been found that a carbon content of 3.98 to 4.12% is most ideally suited for general purposes because it exhibits maximum toughness combined with maximum hardness within that range.

The cast tungsten carbide can be manufactured by melting pure tungsten powder. While in the molten state sufficient carbon is added to obtain the desired percent. It is then cast into suitable shapes in chilled molds, preferably by the centrifugal casting method in order to obtain the densist possible product. The resultant castings are crushed into graded mesh sizes such as 10/20, 20/30, 30/40, 40/60, 60/80 mesh. These mesh sizes may be blended into any number of combinations for use in specific types of applications.

Generally speaking, the particle size of the carbides used is not critical and may vary within wide limits. The size utilized depends primarily on the ultimate utility of the deposit. Various graded particles may be mixed and differing mesh sizes of different carbides may be utilized.

The content of carbide in the tubular rods of the present invention may be utilized in a weight percent as high as about 60 to 85%. This provides more positive and denser coverage of the working area with the useful carbide and still retains sufficient matrix material to bond the carbide grains in place. This is in sharp contrast to previous rods and electrodes which were in general limited to maxmum carbide content of about 60 percent and suffered considerable loss of carbides through solutioning during deposition. Needless to say, lower amounts of carbide may also be used, e.g., as low as 10 weight percent, depending on the desired end use. However, full benefits according to the invention are utilized when the higher proportions of carbides are used. It is most unexpected to find that by utilizing this specific tube material, a high carbide content can be initially used and effectively deposited.

It has also been found advantageous to add small amounts (e.g., from 2–10 percent by weight) of ferro alloys to the carbide filler materials. Contrary to the prior art practices the ferro alloy used should be one which provides the best mixing properties and the least segregation in the filler material. While the prior art was aware that ferro alloys could be utilized within the tube no care was taken in their selection. Generally the alloy should be so chosen that its density is comparable to the density of the carbide utilized. This contributes to proper mixing properties and prevents undue segregation. As a suitable example, ferro tungsten may be used when tungsten carbide comprises the carbide in the filler material. The ferro tungsten is sufficiently close to tungsten carbide in density to be mixed and blended without undue segregation. Such admixtures are beneficial in that the ferro alloy dissolves rapidly in the molten pool during deposition and alloys with the matrix to provide greater wear resistance. It also improves the fluidity of the molten deposit to the point where it can be handled and placed more readily without becoming over fluid.

While the solution of some tungsten carbide has proven fortuitous for many years, the small amount of ferro tungsten will dissolve faster than the carbide thus enhancing the matrix and permitting the deposit to be completed before much of the useful carbide can enter the solution. This provides a strong, wear resistant deposit but not at the expense of the carbides. Ferro tungsten contains in general 75 to 80% tungsten, normally 78% tungsten and is therefore of high specific gravity nearly matching the tungsten carbide. Thus it occupies the smallest possible volume and displaces the minimum amount of carbide.

Ferro alloys which may be utilized depending on the carbide used include not only ferro tungsten but also ferro alloys of silicon, manganese, boron, molybdenum, zirconium, and the like. Commercial grades of these materials are available in varying proportion of iron to alloy agent. Generally the iron may comprise from 10 to 75 percent of the total alloy. Suitable examples are as follows:

FeSi _____ 25, 50, 75, 85, 90
FeMn _____ 70, 80, 90
FeB _____ 18 to 21
FeMo _____ 60, 70
FeZr _____ 18, 35
FeW _____ 75 to 80, 78 wherein the numbers refer to the weight percent of alloying agent, the remainder being substantially iron.

The tubular rods and electrodes according ot the invention may be formed in various ways. The rod may be first preformed, filled with the carbide and other ingredients and then the ends crimped so that the filler ingredients are held within the tube. Preferably, however, the filler is charged into the tubes while they are being formed on a rolling mill from flat steel strip. The special steel strip of the present invention has been found to be outstanding during the manufacturing process, giving better rolling properties and a more positive closure of the seam and ends of the tube. The first operation of this procedure forms the strip into a U shape. The U shaped strip passes the filling station where it receives the charge and is immediately closed into a tube by the crimping and closing rolls. The final rolls tighten the tube down to the desired diameter; after which the filled tube passes through a cut-off operation which cuts and closes the ends of the electrodes at any desired length.

The tube and filler materials may be used in varying weight percents. The most useful ranges for obtaining all benefits of the invention are as follows:

|  | Weight Percent (broad) | Weight Percent (preferred) |
| --- | --- | --- |
| Tube | 40–15 | 33–28 |
| Filler Material | 60–85 | 67–72 |

The filler material can comprise refractory carbide alone in varying mesh sizes or minor additions of ferro alloy and deoxidizers may be included. Suitable ranges are indicated below:

| Constituents | Weight Percent (broad) | Weight Percent (preferred) |
| --- | --- | --- |
| Refractory Carbide | Balance | Balance |
| Ferro Alloy | 0–10 | 0–7.5 |
| Deoxidizer | 0–5 | 0–3 |

As examples of tubular welding rods and electrodes according to the invention are the following:

*Example I*

Filler material: Weight percent
    Tungsten carbide (cast) 30/40 mesh _____ 60
    Tungsten carbide (cast) 40/60 mesh _____ 40
Tube material:
    Carbon _____ 0.18
    Silicon _____ 0.25
    Manganese _____ 1.25
    Iron _____ Balance
    Coating _____ None
Weight percent of filler
  material and tube material:
    Tube _____ 32
    Filler _____ 68

*Example II*

Filler material: Weight percent
    Tungsten carbide (cast) 30/60 mesh _____ 94.5
    Ferro tungsten (80 percent tungsten) _____ 3.5
    Silico manganese (68 percent manganese) _ 2.0

Tube material: Weight percent
- Carbon _____ 0.20
- Silicon _____ 0.30
- Manganese _____ 1.35
- Iron _____ Balance
- Coating (both sides of strip), nickel _____ .009

Weight percent of filler and tube material:
- Tube _____ 29
- Filler _____ 71

*Example III*

Filler material: Weight percent
- Tungsten carbide (cast) 30/40 mesh _____ 57
- Tungsten carbide (cast) 40/60 mesh _____ 38
- Ferro tungsten (80 percent tungsten) _____ 5

Tube material:
- Carbon _____ 19
- Silicon _____ 21
- Manganese _____ 1.15
- Iron _____ Balance
- Coating (one side of strip), chromium ____ .008

Weight percent of filler material and tube material:
- Tube _____ 30
- Filler _____ 70

*Example IV*

Filler material: Weight percent
- Tungsten carbide (sintered) 20/30 _____ 30
- Tungsten carbide (cast) 60/80 _____ 70

Tube material:
- Carbon _____ 0.20
- Silicon _____ 0.25
- Manganese _____ 1.35
- Iron _____ Balance
- Coating (both sides of strip), copper _____ .010

Weight percent of filler material and tube material:
- Tube _____ 30
- Filler _____ 70

*Example V*

Filler material: Weight percent
- Molybdenum carbide 20/80 _____ 94.0
- Ferro molybdenum (70 percent molybdenum) _____ 6.0

Tube material: as Example II
Weight percent of filler material and tube material: as Example II

*Example VI*

Filler material: Weight percent
- Tantalum carbide 30/60 _____ 52.5
- Tungsten carbide 20/40 _____ 40.0
- Ferro tungsten (78 percent tungsten) _____ 5.0
- Silico manganese (65 percent manganese) _ 2.5

Tube material: as Example III
Weight percent of filler material and tube material: as Example III The above constituted welding rods when deposited by thermal fusion produce an outstanding cutting and/or abrasion surface. The deposit contains a high percentage of uniformly deposited carbide particles. The matrix surrounding the particles is hard, shock resistant and uniform. The deposit wears evenly. No loss of carbide particles due to brittleness is noted. No segregation was noted in any of the batches nor after tube formation. The constitution of various tubes formed from the same bath was substantially uniform.

We claim:

1. A tubular rod for depositing a refractory carbide-laden surface upon a parent material consisting essentially of a core of filler material containing refractory carbide particles, said core being contained within an alloy steel having the following constituents in the following percents by weight.

Constituents: Weight percent
- Carbon _____ 0.15 to 0.30
- Silicon _____ 0.15 to 0.40
- Manganese _____ 0.90 to 1.50
- Iron _____ Balance 2. The tubular rod according to claim 1 wherein the alloy steel is present in an amount between 40 and 15 weight percent of said tubular rod.

3. The tubular rod according to claim 1 wherein the alloy steel has the following constituents in the following percents by weight:

Constituents: Weight percent
- Carbon _____ 0.18 to 0.20
- Silicon _____ 0.20 to 0.30
- Manganese _____ 1.10 to 1.40
- Iron _____ Balance 4. The tubular rod according to claim 1 wherein the filler material additionally contains minor amounts of a deoxidizer.

5. The tubular rod according to claim 1 wherein the filler material additionally contains minor amounts of a ferro alloy.

6. The tubular rod according to claim 1 wherein the alloy steel is plated with a metal selected from the group consisting of copper, nickel, tin and chromium.

7. The tubular rod according to claim 1 wherein the carbide particles are tungsten carbide particles.

8. The tubular rod according to claim 1 wherein the filler material comprises the following constituents in the following percents by weight:

Constituents: Weight percent
- Refractory carbides _____ Balance.
- Ferro alloy _____ Up to 7.5.
- Deoxidizer _____ Up to 3.

9. A tubular rod for depositing a refractory carbide-laden surface upon a parent material consisting essentially of a core of filler material containing the following constituents in the following weight percents:

Constituents: Weight percent
- Refractory carbide _____ Balance.
- Ferro alloy _____ Up to 10.
- Deoxidizer _____ Up to 5.

said core being contained within an alloy steel having the following constituents in the following weight percents:

Constituents: Weight percent
- Carbon _____ 0.15 to 0.30
- Silicon _____ 0.15 to 0.40
- Manganese _____ 0.90 to 1.50
- Iron _____ Balance said filler material being present in a weight percent between about 60 and 85 percent of said tubular rod and said alloy steel being present in a weight percent between about 40 and 15 percent of said tubular rod.

10. The tubular rod according to claim 9 wherein the alloy steel has the following constituents in the following weight percents:

Constituents: Weight percent
- Carbon _____ 0.18 to 0.20
- Silicon _____ 0.20 to 0.30
- Manganese _____ 1.10 to 1.40
- Iron _____ Balance 11. The tubular rod according to claim 9 wherein the filler material has the following constituents in the following percent by weight:

Constituents: Weight percent
- Refractory carbide _____ Balance.
- Ferro alloy _____ Up to 7.5.
- Deoxidizer _____ Up to 3.

12. The tubular rod according to claim 9 wherein the filler material is present in a weight percent between about 67 to 72 percent of said tubular rod and said alloy steel is present in a weight percent between about 33 to 28 percent by weight of said tubular rod.

13. The tubular rod according to claim 9 wherein the alloy steel is plated with a metal selected from the group consisting of copper, nickel, tin and chromium.

14. The tubular rod according to claim 9 wherein the refractory carbide is tungsten carbide.

15. A tubular rod for depositing a refractory carbide-laden surface upon a parent material consisting essentially of a core of filler material containing the following constituents in the following weight percents:

| Constituents: | Weight percent |
|---|---|
| Refractory carbide | Balance. |
| Ferro alloy | Up to 7.5. |
| Deoxidizer | Up to 3. | said core being contained within an alloy steel having the following constituents in the following weight percents:

| Constituents: | Weight percent |
|---|---|
| Carbon | 0.18 to 0.20 |
| Silicon | 0.20 to 0.30 |
| Manganese | 1.10 to 1.40 |
| Iron | Balance | said filler material being present in a weight percent between about 67 to 72 percent of said tubular rod and said alloy steel being present in a weight percent between about 33 to 28 percent of said tubular rod.

16. The tubular rod according to claim 15 wherein the alloy steel is plated with a metal selected from the group consisting of copper, nickel, tin and chromium.

17. The tubular rod according to claim 15 wherein the refractory carbide is tungsten carbide, the deoxidizer is silico-manganese and the ferro alloy is ferro tungsten.

18. The tubular rod according to claim 17 wherein the tungsten carbide is a composite WC, $W_2C$ tungsten carbide containing about 4 percent carbon.

19. The tubular rod according to claim 18 wherein the tungsten carbide is cast.

References Cited
UNITED STATES PATENTS

| | | | |
|---|---|---|---|
| 1,441,686 | 1/1923 | Jones | 29—196 |
| 2,040,189 | 5/1936 | Strauss | 29—196 |
| 2,806,129 | 9/1957 | Cape | 29—191.2 |
| 2,888,740 | 6/1959 | Danis | 29—191.2 |

DAVID L. RECK, *Primary Examiner.*

R. O. DEAN, *Assistant Examiner.*